3,183,169
PREPARATION OF SALICYLIC ACID
André R. Brillaud, West Chester, Pa., assignor to Sun Oil Company, Philadelphia, Pa., a corporation of New Jersey
No Drawing. Filed July 22, 1963, Ser. No. 296,447
4 Claims. (Cl. 195—28)

This invention relates to the synthesis of salicylic acid. More particularly, it relates to the production of salicylic acid by the microbiological oxidation of naphthalene. Still more particularly, it relates to the production of salicylic acid from naphthalene by fermentation of a strain of microorganism of the *Corynebacterium renale* type.

Salicylic acid is economically a very valuable and useful compound, particularly in the production of aspirin and the like. Thus, it is an object of this invention to provide a new source for this material. It is a further object to provide salicylic acid in high yield from a low-cost starting material, naphthalene.

It has now been found that high yields of salicylic acid may be obtained by the microbiological oxidation of naphthalene in an appropriate mineral salts medium under aerobic conditions with a strain of microorganism selected from the genus Corynebacterium, and particularly with strains of a newly discovered microorganism designated as *Corynebacterium renale*, a culture of which has been deposited with the American Type Culture Collection in Washington, D.C., under the number ATCC 15,075.

The microorganism *Corynebacterium renale* ATCC 15,075 was isolated from soil in Marcus Hook, Pennsylvania. The organism was isolated in the following manner. A plot of ground was selected and fed regularly with crystalline naphthalene and cultivated at 48-hour intervals. Calcium carbonate was added to the cultivated soil periodically in order to keep environmental pH high. A sample of soil was then taken from the cultivated plot, dried, and pulverized. Approximately 1/10 of a gram of this material was sprinkled on the surface of agar containing Strawinski's medium and crystalline naphthalene was added to an inverted Petri dish cover. Incubation was at 30±2° C. for 7 days at which time a salicylic acid colony was picked and purified. This organism was replated and at this time the colonial description was as follows: yellowish brown, irregularly shaped, convex with erose margin. The culture was replated again with a slight change in colonial morphology being noted. It was now described as gray, circular, convex and entire. Subsequent subcultures finally revealed stabilization of the colony as follows: brown with white center, circular, convex and entire. Maintenance of this culture was on Strawinski's medium in the presence of crystalline naphthalene.

The cultural and physiological characteristics whereby *Corynebacterium renale* ATCC 15,075 is identified and distinguished from other microorganisms are as follows:

(1) Gram stain: Gram positive, club shaped, granules, pleomorphic; size: varies from approximately 1.0 to 1.25 to approximately 1.0 to 2.0μ
(2) Methylene Blue stain: Pleomorphic, pairs with pointed ends, cocci, rods
(3) Acid fast stain: Not acid fast
(4) Phenol Red maltose agar: Good growth, very slight acid, tan, smooth, circular
(5) Loeffler's blood serum: No growth
(6) Dorset egg medium: No growth
(7) Nitrate broth: Good growth, nitrite positive
(8) Kligler iron agar: Good growth, grey, smooth colonies, no $H_2S$.
(9) Methyl Red—Voges Proskauer medium: Methyl Red negative; Voges Proskauer negative
(10) Phenol Red lactose agar: Good growth, slight acid, grey smooth colonies
(11) Phenol Red mannitol agar: Good growth, tan smooth, circular colonies
(12) Phenol Red saccharose agar: Good growth, slight acid, small, colorless, colonies
(13) Glycerol agar: Small, grey, circular, smooth colonies
(14) Phenol Red dextrose agar: Good growth, circular, convex, smooth, colonies, acid
(15) Nutrient agar: Small, cream colored, circular, convex, entire, smooth, moist colonies
(16) Potato dextrose agar: No growth
(17) Litmus milk: Basic
(18) Sim's medium: Indole negative
(19) Starch: No hydrolysis, circular, cream colored, convex, entire, smooth, moist colonies
(20) Catalase: Positive
(21) Gelatin: No liquefaction
(22) Urea and Naph.: Circular, brown centers, tan, convex colonies
(23) Carbohydrate tests in Phenol Red broth using 0.5% specific carbohydrate substrate:
    (a) Mannitol—No acid, no gas
    (b) Levulose—No acid, no gas
    (c) Lactose—No acid, no gas
    (d) Sorbitol—No acid, no gas
    (e) Inositol—No acid, no gas
    (f) Saccharose—No acid, no gas
    (g) Maltose—No acid, no gas Other naphthalene-oxidizing strains of salicylic acid producing microorganisms may similarly be selected from soil samples or culture collections by conducting the fermentation under the conditions described herein. In general, it is desirable to select a specie producing at least 1 gram of product per liter of whole broth.

The nutrient medium for the culture of *Corynebacterium renale* organisms of this invention to produce salicylic acid should contain, in addition to naphthalene as essentially the sole carbon and energy source, a source of available nitrogen and appropriate mineral salts. The naphthalene employed may be either in pure form or as crude mixtures obtained from naphthalenic cuts of crude oil. The quantity of naphthalene employed in this process may range from 0.5 to 10% of the total nutrient medium and preferably should be from 1 to 3%. It is desirable in carrying out this process that the naphthalene be introduced into the fermentation broth in small increments so that the amount present at any one time is below growth-limiting concentration. While the naphthalene may simply be added to the fermentation broth in powdered crystalline form, it has been found that the fermentation proceeds most effectively when the naphthalene is predispersed as an emulsion formed with a dilute aqueous solution of a high molecular weight alcohol such as polyvinyl alcohol.

Examples of suitable sources of nitrogen are ammonium salts such as $(NH_4)_2SO_4$ or, $NH_4Cl$, or nitrate salts such as $NH_4NO_3$, $NaNO_3$ or the like; urea, soybean meal or other organic sources of available nitrogen may likewise be used. Care should be taken when using NaNO₃, however, to see that the pH does not rise much above 6.5 since degradation of salicylic acid tends to increase above this pH level.

The necessary mineral salts which must be present in the medium may vary somewhat depending upon the organism. A suitable mineral salts composition containing the necessary trace elements is as follows:

| | Gms./liter |
|---|---|
| $CaCl_2$ | 0.02 |
| $FeSO_4$ | 0.005 |
| $KH_2PO_4$ | 0.4 |
| $MgSO_4$ | 0.2 |
| $MnCl_2$ | 0.002 |
| $Na_2HPO_4$ | 0.6 |
| $NaMoO_4$ | 0.001 |
| $NH_4NO_3$ | 2.0 |

While no other organic carbon source other than the naphthalene need be present in the fermentation medium for the successful conduct of this process, nevertheless, it has been found that the rate of production of salicylic acid is increased slightly if such growth stimulating materials as yeast extract (e.g., purified Difco) at a concentration of 1 gm./liter is added. Other suitable growth-stimulating materials which may also be used are such substances as distillers solubles, corn steep liquor, or the like.

The process of this invention is desirably carried out at a temperature of from about 25° to 35° C., and preferably from 28° to 32° C. under aerobic conditions with agitation. Although atmospheric concentration of oxygen is necessary for conversion of naphthalene to salicylic acid, it has been found that increased oxygen concentration does not increase the yield of salicylic acid. Thus, sufficient aeration is generally obtained by mechanical agitation during the fermentation period. The medium should be maintained at a pH of from about 6.0 to 8.0, and preferably at about pH 6.5 at which point maximum salicylic acid accumulation results. For optimum yields of salicylic acid, fermentation of the microorganism *Corynebacterium renale* is conducted for about 24 to 96 hours, and preferably for about 48 hours, after which the salicylic acid is recovered.

The salicylic acid may be conveniently recovered from the fermentation broth by any of several methods known in the fermentation art. Thus, for example, salicylic acid may readily be recovered by filtering or centrifuging the whole broth to remove the microorganism and other solids, then contacting the resulting liquor with activated carbon to yield a product which is 99% pure based on reagent grade salicylic acid. This recovery is most conveniently achieved by adjusting the pH of the filtered or centrifuged broth to 7, contacting this broth with 3 weight percent (based on salicylic acid content) of activated carbon at 200° F., cooling and filtering the broth, and acidifying it with a mineral acid such as hydrochloric to a pH 1 to crystallize out 99% pure salicylic acid. This product may, if desired, be further purified by recrystallization from such solvents as acidic water.

Alternatively, salicylic acid may readily be recovered from filtered fermentation broth by neutralizing the broth, contacting it with the chloride form of a weakly basic anion exchange resin such as Amberlite IR-45, and eluting the absorbed acid from the resin with acidified methanol. The salicylic acid is then conveniently recovered from the methanol solution by evaporating it to dryness.

In general, the present fermentation process results in the fermentation of salicylic acid from naphthalene in high yield; for example, yields of better than 6 grams per liter of whole both are obtained when powdered crystalline naphthalene is used, while over 10 grams per liter of acid is recovered when the naphthalene is predispersed in an emulsion with a high molecular weight alcohol. Thus, using the conditions described hereinabove, the conversion of naphthalene to salicylic acid is uniformly obtained at rates as high as approximately 90% of the naphthalene consumed.

The amount of salicylic acid in a particular fermentation broth may be determined not only by actual isolation of the acid in the manner described above but also by the following chemical assay method:

A naphthalene shake flask which has produced salicylic acid is allowed to continue shaking until no more salicylic acid can be observed by FeCl₃ spot test even after extensive liquid-liquid extraction. To this fermentation beer is added to weighed amount of salicylic acid and the pH adjusted to 6.5 whereupon the salicylic acid dissolves. A 0.5 ml. sample of this beer is then placed in a test tube and a duplicate amount is placed in a similar test tube as a reference blank. To the first test tube is added 0.5 ml. of a 1% HNO₃ solution while 1.0 ml. of a 1% HNO₃ solution is added to the blank tube. Thereafter, 0.5 ml. of a 5% Fe(NO₃)₃ reagent is added to the first tube. The color tube and the blank tube are then shaken vigorously and 2.5 ml. of water is added to each of the tubes. If the color in the tubes appears too dark to read in a spectrophotometer, the tubes should be diluted by adding water in multiples of 4.0 ml. The solutions are then filtered through cotton plugs and read on a Beckman-DK2 spectrophotometer for absorbance at 525 mμ. After correction for the reading of a blank containing no salicylic acid, a straight line relationship is found to exist between color absorbance and concentration of salicylic acid over a range of .05 to 1.0 mg. The salicylic acid content of the unknown filtrate is calculated from a pre-prepared calibration curve plotting absorbance at 525 mμ against mgs. per ml. of test material. The actual amount of salicylic acid present is then determined by the following relationship:

(1) Find the mg./test on the graph corresponding to the absorbance at 525 mμ.

(2) mg./ml.=

$$\frac{mg./test \times dilution\ of\ color \times dilution\ of\ beer}{ml.\ beer\ added}$$

The following examples are given for purposes of illustration and not by way of limitation:

*Example 1*

A series of fermentations were carried out in 300 ml. sterilized dispo-plugged Erlenmeyer flasks, using a sterile mineral salts medium of the following composition:

| | Grams/liter |
|---|---|
| $CaCl_2$ | 0.02 |
| $FeSO_4$ | 0.005 |
| $KH_2PO_4$ | 0.04 |
| $MgSO_4$ | 0.20 |
| $MnCl_2$ | 0.002 |
| $Na_2HPO_4$ | 0.6 |
| $NaMoO_4$ | 0.001 |
| $NH_4NO_3$ | 2.00 |
| $CaCO_3$ | 1.00 |

Naphthalene (2 gms.).

The naphthalene was emulsified in 0.5% of polyvinyl alcohol, sterilized, and added separately, as was the sterilized CaCO₃. The pH was adjusted to 6.5. Some naphthalene was added initially (1 gram), and at 40 and 64 hours (0.5 gm. each time).

One hundred ml. of the above medium was inoculated with 1% by volume of a vegetative inoculum of the culture *Corynebacterium renale* ATCC 15,075 and the fermentation carried out on a gyratory shaker at approximately 30° C.±2° for periods ranging from 24 to 96 hours, depending on the rate of production of salicylic acid. The pH was maintained at about 6.5 by periodic additions of CaCO₃.

During the fermentation period, samples of the fermentation broth were centrifuged to remove bacterial cells and residual CaCO$_3$. The amount of salicylic acid in the clear supernatant fluid was determined on a spectrophotometer. The following results were obtained:

| Filtrate No. | Hours of Fermentation [1] | | | |
|---|---|---|---|---|
| | 40 hr.[2] | 64 hr.[3] | 88 hr. | 91 hr. |
| 1 | 2.3 | 2.5 | 5.0 | 5.5 |
| 2 | 2.2 | 3.0 | 7.9 | 7.9 |
| 3 | 0.84 | 4.5 | 6.9 | 7.4 |
| 4 | 2.18 | 2.6 | 6.0 | 6.0 |
| 5 | 0.8 | 2.8 | 6.9 | 6.9 |
| 6 | 1.83 | 2.7 | 6.0 | 6.5 |
| 7 | 1.17 | 3.6 | 7.5 | 8.7 |
| 8 | 0.04 | 2.9 | 8.6 | 9.4 |
| 9 | 1.5 | 3.2 | 6.0 | 6.75 |
| 10 | negative | 2.2 | 6.9 | 7.3 |
| 11 | negative | 2.8 | 9.2 | 11.25 |
| 12 | 5.61 | 11.0 | 9.5 | 9.75 |
| 13 | 4.88 | 11.5 | 9.9 | 10.1 |

[1] Data indicate grams per liter of salicylic acid as determined spectrophotometrically.
[2] 0.5 grams of naphthalene added.
[3] 0.5 grams of naphthalene added.

*Example 2*

A series of fermentations were conducted following the procedure of Example 1 using crystalline naphthalene in place of the emulsified naphthalene. All of the naphthalene (1 gram) was added initially. The salicylic acid yields were determined by the same procedure as Example 1.

| Filtrate | Time of Fermentation [1] | | | | | | |
|---|---|---|---|---|---|---|---|
| | 18 hr. | 24 hr. | 36 hr. | 48 hr. | 60 hr. | 72 hr. | 96 hr. |
| 1 | .37 | .52 | 2.30 | 2.91 | 4.32 | 5.40 | 6.72 |
| 2 | neg. | 1.23 | 3.51 | 5.62 | 6.23 | 7.78 | 9.10 |
| 3 | .50 | .80 | 1.33 | 1.89 | 2.32 | 3.45 | 5.23 |
| 4 | .18 | .97 | 2.13 | 3.24 | 4.50 | 6.0 | 7.34 |
| 5 | .32 | 1.23 | 2.47 | 3.56 | 5.37 | 7.13 | 8.15 |
| 6 | .63 | 2.73 | 4.17 | 6.35 | 8.17 | 9.31 | 7.23 |
| 7 | .18 | 1.56 | 3.91 | 5.32 | 6.1 | 7.22 | 9.21 |
| 8 | .14 | 2.34 | 6.0 | 5.78 | 8.17 | 8.17 | 7.93 |

[1] Data indicate grams per liter of salicylic acid as determined spectrophotometrically.

*Example 3*

A series of fermentations was conducted following Example 1 to determine the salicylic acid yields in the presence of varying nutrients. The mineral salts medium was the same as that used in Example 1. The naphthalene was crystalline and added initially (1 gram). To each of six flasks was added one of the following:

(1) 0.1% soy bean oil meal
(2) 0.1% yeast extract (Difco)
(3) 0.1% yeast extract (S-50)
(4) 0.1% Pharmamedia (complex organic nutrient)
(5) 0.1% dextrose
(6) no nutrient The salicylic acid yields were determined by the same method as Example 1.

| Filtrate | Time of Fermentation [1] | | | |
|---|---|---|---|---|
| | 24 hr. | 48 hr. | 72 hr. | 96 hr. |
| 1. Soy Bean | neg. | neg. | neg. | neg. |
| 2. Yeast Extract | 2.32 | 4.13 | 4.75 | 5.72 |
| 3. S-50 | 1.12 | 1.94 | 2.33 | 3.20 |
| 4. Pharmamedia | 1.21 | 1.76 | 1.98 | 2.41 |
| 5. Dextrose | neg. | neg. | neg. | neg. |
| 6. Control | 1.82 | 3.46 | 4.51 | 5.12 |

[1] Data indicate grams per liter of salicylic acid as determined spectrophotometrically.

I claim:
1. A process for preparing salicylic acid which comprises subjecting naphthalene to the microorganism *Corynebacterium renale* ATCC 15,075 in an aqueous nutrient medium under aerobic conditions.
2. The process according to claim 1 in which the naphthalene is introduced into the fermentation medium as an emulsion with a high molecular weight alcohol.
3. The process according to claim 2 in which the high molecular weight alcohol is polyvinyl alcohol.
4. The process which comprises subjecting naphthalene to the microorganism *Corynebacterium renale* ATCC 15,075 in an aqueous nutrient medium under aerobic conditions at a pH of from about 6.0 to 7.0 and recovering the salicylic acid thus produced.

References Cited by the Examiner

Klausmeier et al.: Journal of Bacteriology 73, 461–464, 1956.

A. LOUIS MONACELL, *Primary Examiner*.